United States Patent Office 3,618,318
Patented Nov. 9, 1971

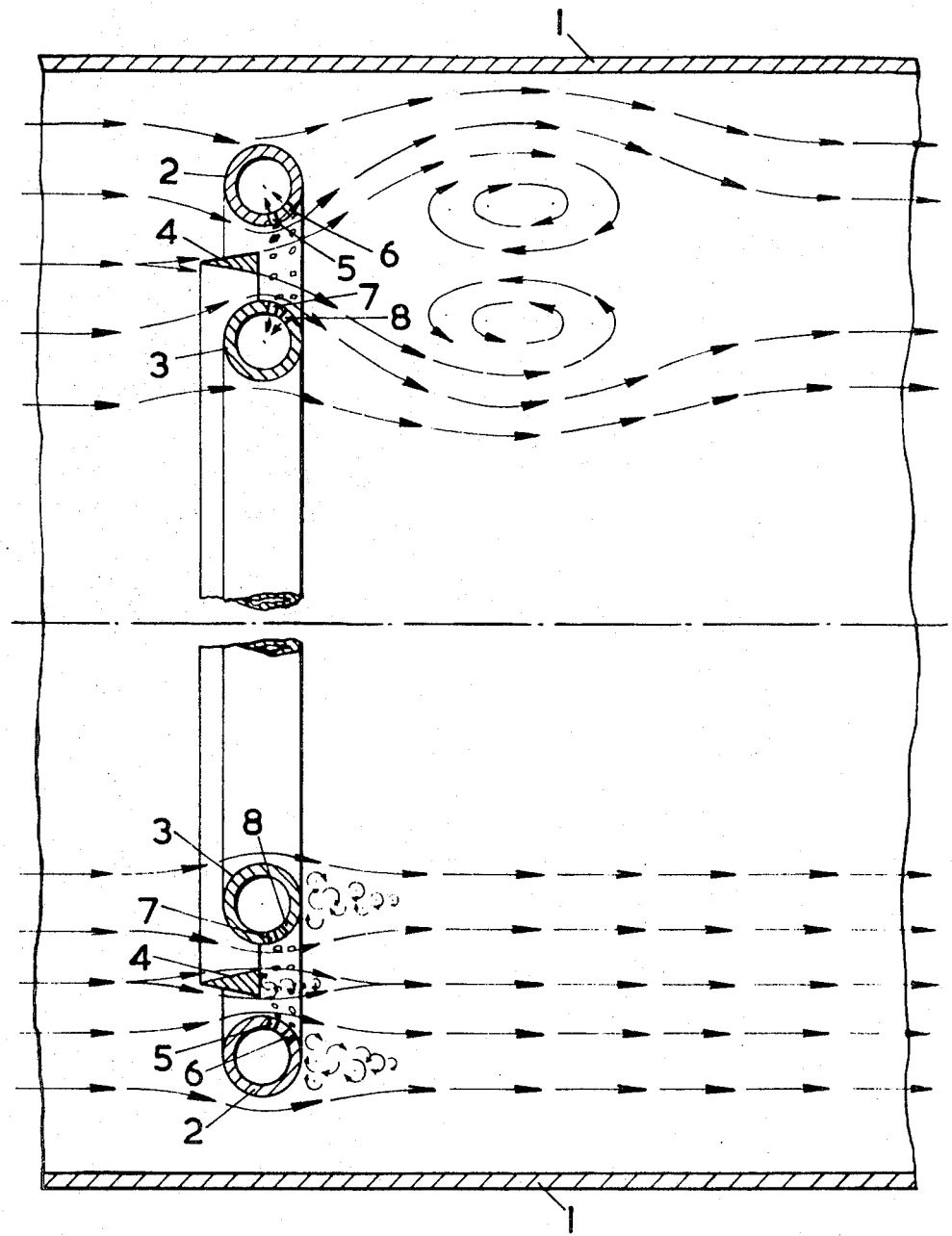

3,618,318
COMBUSTION DEVICES
William Dean Bryce, Farnham, Surrey, England, assignor to Minister of Technology in Her Britannic Majesty's Government of the United Kingdom of Great Britain and Northern Ireland, London, England
Filed June 4, 1969, Ser. No. 830,259
Claims priority, application Great Britain, June 10, 1968, 27,394/68
Int. Cl. F02g 1/00
U.S. Cl. 60—39.72
6 Claims

ABSTRACT OF THE DISCLOSURE

Two concentric annular tubes are mounted co-axially within an afterburner duct with an annular flow splitter disposed between them. Two circumferential rows of holes are drilled in the downstream quadrants of the tubes (relative to flow through the duct) which face each other. The application of suction to the tubes acts through the holes on the boundary layer of flow over the tubes to move the respective separation points further downstream and thus deflect the flow to cause recirculation patterns. A similar effect can be obtained by blowing from suitably shaped apertures in the tubes. The tubes may alternatively be straight and arranged transversely across a duct with their respective axes parallel.

---

The present invention relates to combustion devices wherein a flame stabilisation zone is formed in a swiftly moving gas stream by the separation of flow from the surface of a body disposed within the stream.

In aircraft gas turbine jet propulsion engines, extra power can be developed by burning additional fuel in an afterburner. It has long been the practice in such installations to use fixed baffles to produce stable turbulent (or recirculation) zones in their wakes wherein flames will maintain themselves. Such baffles offer undesirable resistance to flow during such time as afterburning is not in operation. One of the more common forms of fixed baffle is a V-shaped gutter having its apex pointing upstream of the flow, the extreme simplicity of the arrangement tending to outweigh adverse considerations. By setting the arms to an included angle of the order of 45°, or slightly less according to flow velocity, a reasonable optimum between resistance and the provision of an adequate recirculation zone can be obtained.

Nevertheless, baffle resistance can be critical in determining the total amount of afterburning which can be employed, and an afterburner system having a lower pressure loss when in the nonoperating condition is desirable, provided that the penalties arising out of other considerations are not too severe. The present invention is concerned with means directed towards this end, as are prior co-pending U.S. patent application Ser. No. 750,085, filed Aug. 5, 1968 by L. D. Wigg (subsequently U.S. Pat. No. 3,504,491) and co-pending U.S. patent applications Ser. Nos. 830,394 and 830,471, filed conccurrently herewith by the present applicant.

A combustion device according to the invention comprises a member disposed within a fluid duct, a flow splitter spaced from the member, and means for influencing the boundary layer flow over the surface of the member at will so as to deflect at least a part of the main stream flow through the duct and generate a wake including a stable turbulent zone.

Preferably there are two such members spaced apart with a flow splitter situated between them.

In one embodiment, the members and the flow splitter are arranged concentrically as an annular array.

One embodiment of the invention will now be described by way of example with reference to the accompanying diagrammatic drawing which is an axial section through an afterburner duct including a flame stabiliser.

The afterburner duct shown in the drawing comprises a cylindrical casing 1 extending between a turbine outlet and a jet propulsion nozzle (neither of which is shown), the direction of gas flow being from left to right as indicated by the arrows at the left. Two concentric annular tubes 2, 3 are mounted coaxially within the duct with an annular flow splitter 4 dispoesd between them. The flow splitter 4 comprises a ring of wedge-shaped cross section with the narrow end of the wedge directed upstream slightly in advance of the leading edges of the tubes 2, 3 and its thick end in line with the centres of the tubes.

Two circumferential rows of closely-spaced holes 5, 6 are drilled radially through the inner rear quadrant of the tube 2 (relative to the axis of the duct and the direction of flow through it), the holes subtending an angle of 30° at the center of the tube section. Two circumferential rows of holes 7, 8 are likewise drilled through the outer rear quadrant of the tube 3, the holes in the tubes thus being on opposite sides of the passage formed between the tubes.

In normal circumstances, gases passing along the duct will flow around the tubes 2, 3 and the flow splitter 4 with little disturbance as shown in the lower part of the drawing. When afterburning is required, suction is applied to the interior of the tubes and acts through the holes 5, 6, 7, 8 to draw off the boundary layer of the flow passing over the tubes with the result that the said flow will adhere to the surfaces of the respective quadrants of the tubes downstream of the normal separation point and the flow will thus be deflected with consequent turbulence, stable recirculation zones being set up as shown in the upper part of the drawing, the flow splitter 4 acting to prevent diffusion of the flow. Fuel injected into the duct upstream of the tubes and ignited conventionally can thus be induced to burn and the flame will maintian itself in the recirculation zone during such time as suction continues to be applied to deflect the flow.

The width of recirculation zone obtainable is believed to be roughly equal to the total width of the stabiliser, i.e. the distance between the radially innermost point on the tube 3 and the radially outermost point on the tube 2 as shown in the drawing. This is equivalent to that produced by a V-shaped baffle of the same total width, the free-stream drag coefficient of which will be approximately 1.3 times greater. But, in addition, the duct blockage is halved and hence, for blockages of up to about 30 percent, the duct loss coefficient will be about two-thirds of that of the equivalent baffle and the pressure loss when afterburning is not in operation will thus be of the order of two-thirds of that resulting from such a baffle.

Various departures from the general configuration described are possible to suit the requirement of a particular installation. One such arrangement comprises a pair of parallel tubes extending transversely across a duct with a straight flow splitter located between them, suction being applied in similar fashion as previously. If necessary, a series of such pairs of tubes can be arranged across the duct.

Again, the tubes may be of other than circular cross-section whereby their drag in free-stream flow will be reduced. Alternatively, drag-reducing fairings might be applied to the tubes.

Flame stabilisers as described herein are not restricted to use in afterburners, but may be used also, for example, in by-pass ducts of turbofan engines where it is desired to produce extra power intermittently by burning fuel in such ducts.

I claim:

1. A combustion device, comprising: first and second members mounted in a fluid flow duct in spaced relation to each other; flow splitter means spaced between said first and second members; suction applying means for controlling boundary layer flow over the surface of said members; and means, including said first and second members, deflecting at least a part of the flow in said duct to generate a wake including a stable turbulent zone.

2. The device of claim 1, wherein at least one of said members comprises a tube having holes extending through the surface thereof.

3. The device according to claim 1, wherein said first and second members comprise concentric annular tubes having holes extending therethrough in the rear quadrants thereof relative to the direction of flow in said duct and on opposite sides of the passage formed between said tubes; and means for applying a suction to the interior of said tubes.

4. The device according to claim 3, wherein said holes are disposed in at least two circumferential rows in each tube.

5. A combustion device according to claim 4 in which the rows of holes in each tube subtend an angle of substantially 30° at the center of the tube section.

6. A combustion device according to claim 1 in which the flow splitter is of substantially wedge-shaped cross-section with the narrow end of the wedge directed upstream relative to flow in the duct.

References Cited

UNITED STATES PATENTS

| | | | |
|---|---|---|---|
| 3,016,704 | 1/1962 | Duncan et al. | 60—39.72 |
| 3,046,731 | 7/1962 | Cambel et al. | 60—39.72 X |
| 3,504,491 | 4/1970 | Wigg | 60—39.72 |

FOREIGN PATENTS

| | | | |
|---|---|---|---|
| 836,058 | 7/1957 | Great Britain | 60—39.72 |
| 69,634 | 7/1958 | France | 60—39.72 |

CARROLL B. DORITY, JR., Primary Examiner